March 29, 1966     F. L. RAPOSA ETAL     3,243,725
SHORT CIRCUIT PROTECTOR
Filed Oct. 30, 1962
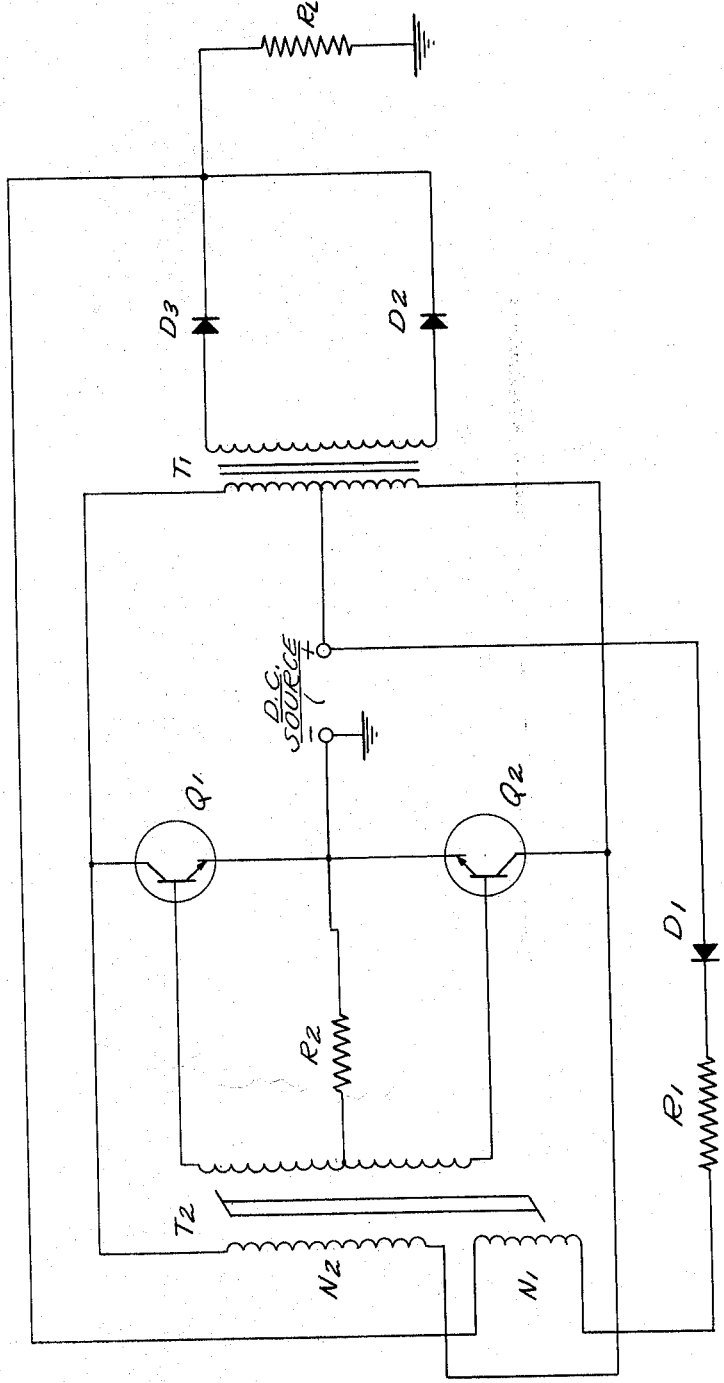
INVENTORS
FRANK L. RAPOSA
FRANCIS LAWN
BY Roger A. Van Kirk
ATTORNEY

United States Patent Office 3,243,725
Patented Mar. 29, 1966

3,243,725
SHORT CIRCUIT PROTECTOR
Frank L. Raposa, Vernon, and Francis Lawn, Windsor, Conn., assignors to United Aircraft Corporation, East Hartford, Conn., a corporation of Delaware
Filed Oct. 30, 1962, Ser. No. 234,120
3 Claims. (Cl. 331—113)

Our invention relates to a short circuit protector for a source of electrical energy. More particularly, our invention is directed to a short circuit protector for a direct current source which is supplying a static inverter or converter.

It is, of course, obvious that means must be provided to disconnect the direct current source from a static inverter or converter in situations where the load being supplied by the inverter or converter becomes short circuited. In the prior art, this short circuit protection has been universally accomplished by the use of electro-mechanical components such as relays which were sensitive to excessive load current. In their usual environment, such as missile or aeronautical power supplies, a restriction is placed on the size or weight of the inverter or converter. The above mentioned electro-mechanical devices suffer from relatively large size and, where automatic resumption of operation upon the removal of the short circuit is necessary, from comparative complexity. These electro-mechanical devices also lack the necessary reliability since contacts are subject to failure through pitting. An added defect in the prior art short circuit protectors is that the voltage or current sensing element used therein was generally in series with the load and therefore dissipated power which otherwise would have been supplied to the load. This, of course, diminished the efficiency of the inverter or converter and required the use of components having higher power ratings with their corresponding larger size and weights.

Our invention overcomes the disadvantages of the prior art by providing a novel short circuit protector for a static inverter or converter.

It is therefore, an object of our invention to provide short circuit protection for the source which supplies a static inverter or converter.

It is another object of our invention to automatically limit current flow from the source which supplies a static inverter or converter when the load on the inverter or converter becomes short circuited.

It is yet another object of our invention to automatically resume normal operation by deactivating the short circuit protector upon the removal of the short circuit from the load on a static inverter or converter.

It is still another object of our invention to provide simple, inexpensive, light weight, and reliable circuitry to accomplish the other objects of our invention.

These and other objects of our invention are accomplished by a novel short circuit protector. This protector is connected between a D.C. voltage measured across the load and the source voltage. When the voltage across the load drops below the source voltage, the short circuit protector becomes activated and permits current to flow through a saturating winding on the feed-back transformer of the oscillator which drives the switching circuit of the static inverter or converter. This current flow causes saturation of the feed-back transformer which in turn results in discontinuation of the oscillations and thus a shutdown of the switching means thereby preventing current flow from the source through the inverter or converter output transformer.

Our invention may be better understood and its numerous advantages will become apparent to those skilled in the art by reference to the single figure of the accompanying drawing which shows our novel short circuit protector used with a self-oscillating static converter.

This self-oscillating converter utilizes a pair of switching transistors, Q1 and Q2, and two transformers, T1 and T2, one of which is saturable. Self-oscillating converters or inverters of this type are well known in the art and are disclosed in an article by A. Sorenson entitled "Design Techniques for Static Inverters" which appears on pages 79 through 87 of the January 1960 issue of Electrical Manufacturing. In operation, transistors Q1 and Q2, which are connected in push-pull, conduct alternately thereby causing current to flow alternately in opposite directions in opposite halves of the primary windings of transformer T1. As is well known, the oscillation or alternate conduction of transistors Q1 and Q2 is sustained by positive feed-back to the bases of the push-pull pair of transistors through winding $N_2$ of saturable transformer T2. Output transformer T1 is a step-up transformer. The A.C. voltage induced in the secondary winding of this transformer by the alternately flowing current in its primary winding may be filtered and the circuit will thus function as a static inverter. Conversely, as shown in the accompanying drawing, the voltage induced in the secondary winding of transformer T1 may be rectified by a pair of diodes D2 and D3 and the circuit will thus function as a converter and will produce a D.C. voltage which is higher than the voltage from the source.

The short circuit protector of our invention operates on the principle that at core saturation of a saturable transformer, a further increase in current does not increase the flux in the core. Since the flux remains comparatively constant, no voltage is induced in the windings by such further increases in current. This being the case, saturation of feedback transformer T2 causes degeneration of the feedback power thus preventing current flow in the primary winding of transformer T2 from causing a voltage to be induced in the secondary winding of this transformer and thus the oscillator will be shut down since there will be no positive feedback. D.C. saturation of transformer T2 is obtained in our invention by connecting winding $N_1$ of transformer T2 in series with the input and output terminals of the converter. Also connected in this series circuit is a current limiting resistor R1 and a diode D1. Under normal operating conditions, diode D1 is back biased by an amount equal to the difference between the source and load voltages. When the load becomes short circuited, the converter output voltage drops to ground potential and diode D1 becomes forward biased. The forward biasing of diode D1 permits current to flow from the positive terminal of the source through winding $N_1$ of transformer T2 back to the negative terminal of the source. The current I flowing in winding $N_1$ will be limited by the value of resistor R1. However, this D.C. current flow will be sufficient to drive the transformer T2 into D.C. saturation. The extent of saturation will be determined by the ampere turns $N_1 I$.

When the short circuit is removed, the load resistance $R_L$ will then be connected in series with winding $N_1$ and the current flowing through winding $N_1$ will accordingly be decreased to $I'$. If the ampere turns $N_1 I'$ is not enough to sustain D.C. saturation of transformer T2, the oscillator will start but will not deliver full power. When the output or load voltage exceeds the input voltage, diode D1 will again become back biased and current will stop flowing in winding $N_1$. Thus, upon removal of the short circuit, normal operation is automatically resumed.

The degree of D.C. saturation required will be determined by the power level of the oscillator. In low power applications, the degree of saturation may not be important, but in cases where a starting circuit is involved, that is at higher power levels, it may not be desirable to go completely into D.C. saturation because the oscillator may not start again after the short circuit has been removed. Under these circumstances it is possible to choose the value of resistor R1 such that the number of ampere turns under short circuit conditions is enough to cause transformer T2 to be on the verge of saturation. Under these conditions the oscillator will not completely shut down, but will operate at practically zero output level at a very high frequency.

The type of short circuit protector which comprises our invention may have application in any circuit where transformers, such as transformer T2 of the circuit above described, are operating at a low power level. By simply saturating the transformer under short circuit conditions the rest of the system can be made to shut down. The amount of current flowing in the saturated transformer will be limited by the transformer resistance which can be sized accordingly. Thus our invention is described by way of illustration rather than limitation and accordingly it is understood that our invention is to be limited only by the appended claims taken in view of the prior art.

We claim:

1. A short circuit protector for a source of electrical energy comprising:
    switch means connected between the source to be protected and a load circuit for controlling the transmission of power from the source to the load circuit,
    a source of reference voltage,
    means for comparing the reference voltage with the load voltage and for generating a signal commensurate with the difference therebetween only when the reference voltage exceeds the load voltage, and
    means connected to said comparing means and responsive to said difference signal for disabling said switch means when the load voltage drops below the reference voltage whereby no power will be transmitted from the source to the load when the load voltage falls below the reference voltage.

2. A static converter comprising:
    a source of low voltage direct current,
    a pair of semiconductor switch means connected in push-pull,
    means connecting a first polarity terminal of said source to the interconnected first contacts on each of said pair of switch means,
    an output transformer connected between the second polarity terminal of said source and the second contact on each of said pair of switch means,
    a saturable transformer having a pair of primary windings and a secondary winding,
    means connecting one of the primary windings of said saturable transformer across said pair of switch means,
    means connecting opposite ends of the secondary winding of said saturable transformer to switching control contacts of respective ones of said pair of switch means whereby a signal is fed back from the output to the control element of the pair of switch means thereby causing the pair of switch means to oscillate,
    means connected across the secondary winding of said output transformer for rectifying the voltage induced therein by virtue of the alternating current flow in the primary winding caused by the alternate closing of said oscillating switch means,
    means including the second of the primary windings of said saturable transformer connected between said source and said means for rectifying for causing saturation of said saturable transformer when the output voltage from the rectifier falls below the source voltage whereby saturation of the saturable transformer prevents feedback of the oscillation sustaining signals and said switch means are thus disabled.

3. A short circuit protector for a source of electrical energy comprising:
    an oscillating circuit connected between the source to be protected and a load circuit for controlling the transmission of power from the source to the load circuit;
    a source of reference voltage;
    means for comparing the reference voltage with the load voltage and for generating a signal commensurate with the difference therebetween only when the reference voltage exceeds the load voltage; and
    a saturable transformer having primary, secondary and saturating winding, said primary winding being connected across said oscillating circuit, said secondary winding being connected to said oscillating circuit so as to provide the feedback signals necessary to sustain oscillation, and said saturating winding being connected to said comparing means whereby generation of a difference signal by said comparing means will cause current flow through said saturating winding thereby resulting in saturation of said transformer and disabling of the oscillating circuit.

References Cited by the Examiner

UNITED STATES PATENTS

| | | | |
|---|---|---|---|
| 2,791,739 | 5/1957 | Light | 321—2 |
| 3,072,837 | 1/1963 | Hakimoglu | 321—2 X |
| 3,117,270 | 1/1964 | Tailleur | 321—2 |

FOREIGN PATENTS

| | | |
|---|---|---|
| 1,038,618 | 9/1958 | Germany. |

LLOYD McCOLLUM, *Primary Examiner.*

G. J. BUDOCK, J. C. SQUILLARO, W. H. BEHA,
*Assistant Examiners.*